Nov. 4, 1969    E. H. WARNE    3,475,910
FUEL SYSTEMS FOR GAS TURBINE ENGINES
Filed Oct. 10, 1967    2 Sheets-Sheet 1

Inventor
Eugene Harold Warne
By
Attorneys

Nov. 4, 1969  E. H. WARNE  3,475,910
FUEL SYSTEMS FOR GAS TURBINE ENGINES
Filed Oct. 10, 1967  2 Sheets-Sheet 2

INVENTOR.
EUGENE HAROLD WARNE

United States Patent Office 3,475,910
Patented Nov. 4, 1969

3,475,910
FUEL SYSTEMS FOR GAS TURBINE ENGINES
Eugene Harold Warne, Solihull, England, assignor to Joseph Lucas (Industries) Limited, Birmingham, England
Filed Oct. 10, 1967, Ser. No. 674,232
Int. Cl. F02c 9/08, 7/32, 9/10
U.S. Cl. 60—39.28                    6 Claims

ABSTRACT OF THE DISCLOSURE

A fuel system for a gas turbine engine having an air driven pump and a manually operable throttle, servo operated throttle in series with the manual throttle between the pump and the engine, said servo operated throttle being responsive to changes in a plurality of parameters and also serving as a shut-off cock in the system and there being a servo responsive to the pressure drop across the throttles for controlling the volume of air supplied to an air driven turbine for the pump.

---

This invention relates to fuel systems for gas turbine engines of the kind comprising pumping apparatus for delivering fuel under pressure from a reservoir to the engine, the flow of fuel being controlled by throttle means, variable in accordance with changes in a plurality of parameters.

The object of the invention is to provide a fuel system of the kind set forth in a convenient form.

In accordance with the present invention a fuel system for a gas turbine engine comprises, in combination, pumping apparatus to deliver fuel under pressure from a reservoir to the engine, said pumping apparatus including a pump driven by an air driven turbine, a manually operable throttle disposed between the pumping apparatus and the engine, and a further throttle between said manually operable throttle and the engine, said further throttle being responsive to changes in a plurality of parameters, and also serving as a shut-off cock for the system, and means responsive to the pressure drop across both the throttles to control the volume of air reaching the air driven turbine.

Figure 1:
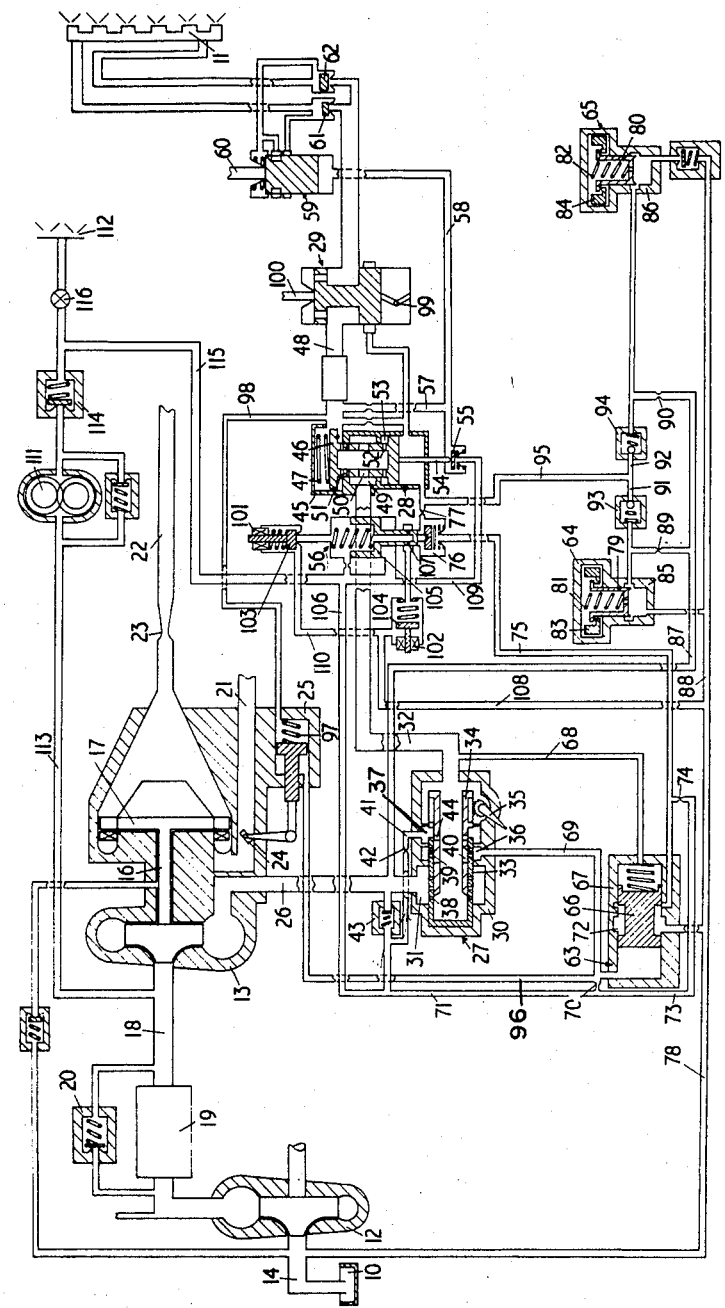
Figure 2:
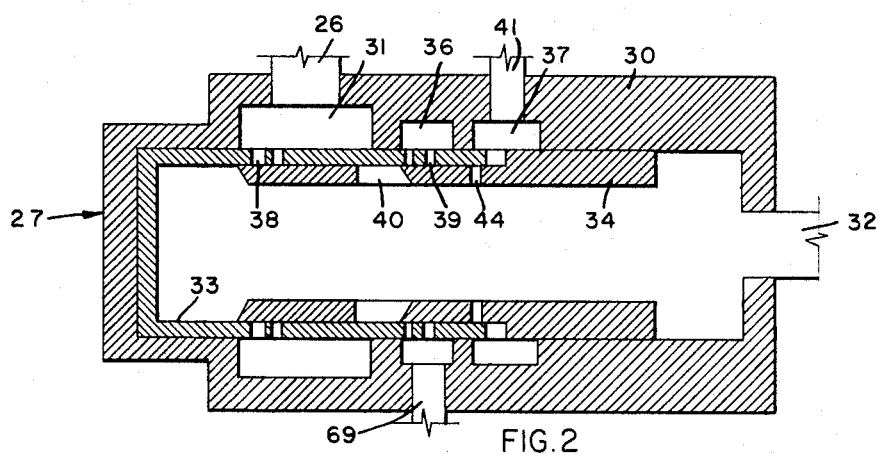
Figure 3:
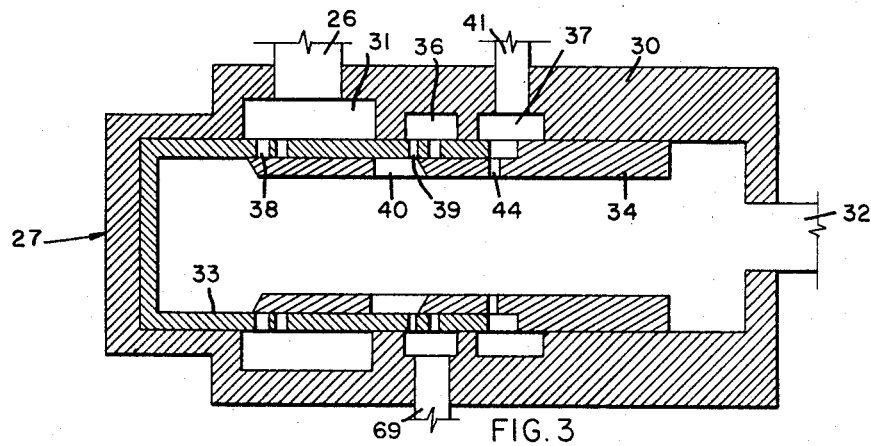
Figure 4:
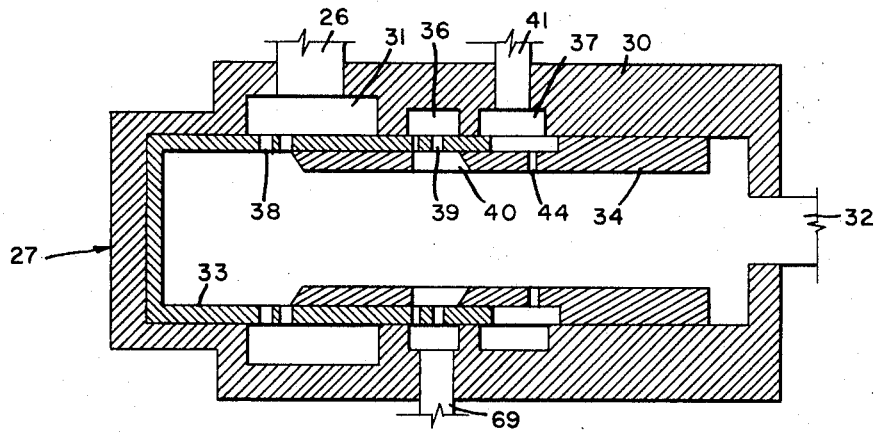

The invention will now be described by way of example with reference to the accompanying drawings in which FIGURE 1 illustrates diagrammatically a fuel system for a gas turbine engine constructed in accordance with the present invention, and FIGURES 2, 3 and 4 show on an enlarged scale a throttle valve in the system in closed, idling and fully opened positions respectively.

The fuel system illustrated in FIGURE 1 comprises a main duct for the supply of fuel between a reservoir 10 and a burner manifold 11 in the engine. To draw fuel from the reservoir 10 there is pumping apparatus including first and second centrifugal vane type pumps 12, 13 arranged in series, an inlet passage 14 to the pump 12 communications with the reservoir 10. This pump 12 is driven through a shaft 15 from the engine with which the fuel system is associated. The second pump 13 is arranged to be driven through a shaft 16 by an air driven turbine 17. A passage 18 including a cooler 19 and pressure relief valve 20 provides communication between the outlet of the pump 12 and the inlet of the pump 13. The turbine 17 obtains a supply of air through an inlet passage 21 and this is discharged through an outlet passage 22 having a venturi 23 throttle 24. The turbine obtains its air supply from downstream of the compressor or the last of the compressors in the associated engine. A throttle 24 controlled by a piston and cylinder type servo device 25 controls the volume of air reaching the turbine 17. The output passage from the second pump 13 is indicated at 26.

The pumping apparatus is of variable output and control is achieved by the throttle 24 to determine the supply of air through the turbine 17 and therefore the contribution made by the pump 13 to the pressure in the outlet passage 26.

This pumping apparatus is described and claimed in U.S. patent application No. 674,231, filed on Oct. 10, 1967.

Between the outlet passage 26 from the pumping apparatus and the manifold 11 in the engine, there is a manually operable throttle 27 and a servo operated throttle 28 in series with it. There is also a rapid shut off cock 29.

The manually operable throttle 27 comprises a cylindrical body 30 having an inlet connected to the passage 26, in its side communicating with an internal annular gallery 31. At one end of the body 30 is an outlet connected to a passage 32 leading to the servo throttle 28. Within the body 30 is mounted a sleeve 33, and within this is slidably mounted an inner sleeve 34 movable axially by means of a manual throttle lever 35. Two further internal annular galleries 36, 37 are provided in the body 30.

The sleeve 33 has two sets of holes 38, 39 in its wall, the smaller set 38 communicating with the gallery 31 and the larger set 39 with the gallery 36. The inner sleeve 34 however controls the flow of fuel through the sets of holes 38, 39 and for this purpose has openings 40 affording communication between the interior of the inner sleeve 34 and the holes 39. The edge of the inner sleeve provides a metering edge for the flow through the holes 38. Holes 44 in the inner sleeve 34 can communicate with the gallery 37.

The gallery 37 communicates with an idling by-pass passage 41 including a variable needle valve 42. This passage 41 communicates with the passage 26 at the upstream side of the throttle 27 through a pressurising valve 43. FIGURE 2 shows the throttle valve 27 in the closed position. The inner sleeve 34 covers holes 38 and 39 and the edge of the sleeve 33 prevents flow through the holes 44.

FIGURE 3 shows the idling condition in which the inner sleeve 34 has been moved to uncover the holes 39, though not the holes 38. The holes 44 are also uncovered. In this condition of the throttle valve 27, the fuel from 26 can reach the outlet 32 through the passage 41, passed the valve 43. This is the flow required for idling of the engine. Some fuel, however, also flows through passages 69 and 71, the former including a restrictor 70. Passage 71 communicates with passage 26 through the valve 43. The degree of opening of the holes 39 determines the flow taking place through the passages 69 and 71.

FIGURE 4 shows the throttle 27 in the fully open position. The holes 38 and 39 as well as the holes 44 are uncovered, though the flow through the holes 39 and 44 is small by comparison with the main flow taking place through the holes 38.

The servo throttle 28 has a body 45 containing a hollow piston 46 against which a spring 47 acts. The body 45 has a main inlet from the passage 32 and a main outlet to a passage 48 leading through the rapid shut-off cock 29, to the engine burner manifold 11. The body 45 of the servo throttle has a gallery 49, communicating with the inlet and the piston 46 has openings 50 communicating therewith at all its axial positions in the body 45.

Further sets of openings 51 in the piston 46 meter flow between the inlet gallery 49, through the interior of the piston 46, to the outlet and the passage 48. Still further openings 52 in the piston 46 afford communication between the piston interior and a portion 53 of the body cavity divided from the remainder by a flange to provide means whereby fuel pressure can act on the piston in the same direction as the spring 47.

The end of the piston 46 remote from the spring 47 carries a valve actuating rod 54 acting against a spring-loaded valve closure member 55. This member 55 controls flow of fuel to an electrical solenoid controlled valve 56 (to be further described) from the passage 48 through a restricted passage 57. The existence of fuel under pressure in the passage 57 and in a communicating passage 58 serves to hold closed a dump valve 59 which, when opened allows fuel from the burner manifold 11 to escape through a passage 60. The manifold is illustrated as having two independently fed portions, controlled by pressurising valves 61, 62 respectively.

The opening of the servo throttle 28 is controlled by the balance of pressures acting on the piston 46. The pressure existing in the end of the body 45 remote from the spring 47 is controlled by a pressure drop sensing unit 63 and by high and low pressure governors 64, 65.

The pressure drop unit 63 is in the form of a spring loaded spool 66 mounted in a body 67. The unit is intended to maintain a constant pressure drop across the manual throttle 27. The pressure downstream of this throttle reaches the pressure drop unit 63 through a passage 68 and that at its upstream side reaches it through the passage 71 and through the pressurising valve 43. During initial stages of opening of the throttle valve 27 the pressure in the left hand end of the unit 63 varies in accordance with the degree of restriction created by the holes 39 in the throttle valve 27. The holes 39 form a variable orifice of a fluid potentiometer, the fixed orifice of this being the restrictor 70. When the holes 39 are fully open, the pressure drop unit maintains a constant pressure drop across the throttle valve 27, though when the holes 39 are only partly open, the pressure drop across the throttle valves 27 is modified.

The pressure drop unit has an intermediate gallery 72 in its spool 66 to which fuel is fed through a passage 73 communicating with the passage 71 from the pumping apparatus outlet 26. The passage 73 includes a fixed restrictor 74 and a variable restrictor of a potentiometer arrangement is provided by the edge of the spool 66 of the unit 63 controlling flow to the gallery 72. The pressure between these two restrictors is exerted upon the servo throttle piston 46 at its end remote from the spring 47, through a passage 75. This passage 75, however also includes a valve 76 and a fixed restrictor 77, the former being controlled by the solenoid operated valve 56. The pressure in the gallery 72 of the pressure drop unit 63 is that at the pumping apparatus inlet, with which it communicates through a passage 78.

The high and low pressure governors 64 and 65 are identical and comprise speed responsive valve members 79, 80 controlled by springs 81, 82 and weights 83, 84 respectively. The members 79, 80 are axially movable within their bodies 85, 86 to control fuel flow from a passage 87 to a further passage 88. The passage 87 communicates with the passage 26 upstream of the manual throttle 27, and has respective restrictors 89, 90 associated with the governors 64, 65 respectively. The passage 88 communicates with the passage 78 to the inlet of the pumping apparatus. Between the restrictors 89, 90 and the governors 64, 65 respectively are connected further passages 91, 92 including respective non-return valves 93, 94. These passages communicate with the servo throttle 28 through a passage 95, at a position in the passage 75, between the fixed restrictor 77 and the servo throttle itself. The governors 64, 65 are driven by the two shafts of the engine respectively.

The piston of the servo device 25 of the air driven turbine 17 is subjected at one side to the pressure at the upstream side of the throttle valve 27 through the passage 71 and a passage 96. This is also the pressure at the left-hand side of the pressure drop unit 63, passage 96 being connected to the passage 71 adjacent to its communication with the pressure drop unit 63. The other side of the servo device 25 has a spring 97 and is subjected to pressure at the downstream side of the servo throttle 28 exerted through a passage 98.

The system thus far described, during normal running conditions, provides a supply of fuel to the engine burner manifold 11 which is dependent upon the opening of the throttles 27, 28, the former being manually controlled. The throttle 28 is controlled in accordance with parameters related to engine operating conditions. It is controlled by engine speed, the governor 64, 65 providing signals of this to the servo throttle 28. Additionally, the pressure drop across both throttle 27, 28 determines the amount of air which can reach the air driven turbine 17 and thus contribution of that pump to the pressure of fuel delivered to the engine.

A quick shut-down valve 29 is provided downstream of the servo throttle 28. When this is opened mechanically through a linkage 99, fuel from the passage 48 can escape through a passage 100.

Shut-down normally is achieved by actuating the solenoid operated valve 56, in order to shut the valve 76 controlled thereby. This allows the pressure in the servo throttle 28 to fall so that this throttle is closed. This has the effect of stopping flow in the passage 48 to the engine, and with closure of the valve 55, the pressure in the dump valve 59 will fall to allow fuel in the burner manifold 11 to escape through the passage 60.

Actuation of the valve 56 is controlled by two electrical solenoids 101, 102. The solenoid 101 controls a valve closure member 103 and the solenoid 102 controls a similar member 104. The valve 56 itself has a spring-loaded member 105 to one side of which fuel at the pressure of the passage 26 is admitted through a passage 106. This fuel can escape through a restricted opening 107 in the member 105, through the solenoid valve 104 to the inlet of the pumping apparatus, through a passage 108, this being possible when the solenoid valve 104 is open, as it is when the engine is running. The opening of the valve 55 admits fuel to the side of the member 105 of the valve 56, through a passage 109, at the pressure existing at the downstream side of the servo throttle 28, as modified by flow through the restricted passage 57.

To shut down the flow of fuel to the engine, the solenoid 102 is operated so that the valve 76 will close as a result of rise in pressure in the end of the valve 56 having the spring. Closure of the valve 76 cuts off pressure from the passage 75 from the pressure drop unit. This in turn will cause the servo-throttle 28 to close.

Starting of the engine can be achieved by actuating the solenoid valve 103 which, through a passage 110 connects the side of the valve 56 with the pumping apparatus inlet through the passage 108. The solenoid valve 104 must however be opened. The member 105 of the valve 56 will now move, as pressure is built up at the opposite end of the member 105. The valve 103 can now be closed again by de-energisation of the solenoid 101 and the member 105 will maintain a balance position.

However since the pumping apparatus comprises centrifugal pumps 12, 13 slow running of the engine during starting will fail to produce sufficient pressures to open the servo throttle 28, nor will the valve 56 be operated allowing the closure of the solenoid valve 103 to take place.

Accordingly there is provided an electrically driven pump 111 serving igniter burners 112 in the engine. This system is supplied through a passage 113 from the passage 18 between the pumps 12, 13 and also includes a pressurising valve 114. At a position downstream of the valve 114 is a passage 115 which permits pressure at the downstream side of the pump 111 to be exerted upon the valve 56. This pressure also reaches the servo throttle 28 through the passages 115, 106, 71, 73, 75 and past the now open valve 76.

The pump 111 will be stopped and the valve 114 will operate as a non-return valve when the main system delivers sufficient pressure to maintain the various pressure balances required in the system. A shut-off cock 116 will prevent fuel being delivered from the main system to the igniter burners 112.

Only one governor is required if the engine is of the kind having a single shaft.

Having thus described my invention what I claim as new and desire to secure by Letters Patent is:

1. A fuel system for a gas turbine engine comprising pumping apparatus, including a non-positive displacement type pump, arranged to deliver fuel under pressure from a reservoir to the engine, an air driven turbine arranged to drive said non-positive displacement pump, an air supply passage leading to said air driven turbine, an air throttle valve in said air supply passage, a piston and cylinder type servo device arranged to control said air throttle valve, a manually controlled fuel throttle valve and a servo operated fuel throttle arranged in series between said pump and the engine, said servo operated throttle being responsive to changes in a plurality of parameters related to engine operating conditions, and passage means whereby the pressure drop created by both fuel throttles is applied to the servo device for the air throttle, to control the air reaching the air driven turbine.

2. A fuel system as claimed in claim 1 including a pressure drop sensing unit which is arranged to sense the pressure drop created by the manual throttle valve, the manual throttle valve having fuel flow passage means whereby the pressure at the pressure drop sensing unit which is applied to one side of the servo device for the air supply throttle, is modified under predetermined operating conditions.

3. A fuel system as claimed in claim 1 in which the manual throttle valve has main and idling flow passage means.

4. A fuel system as claimed in claim 1 having at least one engine speed sensitive fuel valve device, and passage means whereby a fuel pressure related to the opening of said device is applied to the servo operated fuel throttle to control its opening.

5. A fuel system as claimed in claim 1 in which there is a further electrically driven pump operable when starting the associated engine, and passage means affording communication between said pump and means for opening the servo operated fuel throttle.

6. A fuel system as claimed in claim 1 in which there is a solenoid operated valve which in one position permits fuel to reach the servo operated throttle to hold it in an open position, and in another position prevents sufficient pressure in the servo operated throttle to hold it open.

References Cited
UNITED STATES PATENTS

| | | | |
|---|---|---|---|
| 2,742,755 | 4/1956 | Davies et al. | 60—39.28 X |
| 2,874,540 | 2/1959 | Esmeier et al. | 60—39.28 X |
| 2,916,876 | 12/1959 | Colley et al. | 60—39.28 |
| 2,964,904 | 12/1960 | Davies | 60—39.28 X |
| 3,105,354 | 10/1963 | McCombs | 60—39.28 |
| 3,195,308 | 7/1965 | McCombs | 60—39.28 |

AL LAWRENCE SMITH, Primary Examiner